United States Patent [19]

Alnafissa

[11] Patent Number: 4,713,011
[45] Date of Patent: Dec. 15, 1987

[54] SOLAR SYSTEM SIMULATOR

[76] Inventor: Fahad A. Alnafissa, 2407 Wilshire Blvd. #4, Santa Monica, Calif. 90403

[21] Appl. No.: 941,726

[22] Filed: Dec. 12, 1986

[51] Int. Cl.⁴ .............................................. G09B 27/02
[52] U.S. Cl. ...................................................... 434/292
[58] Field of Search ......................................... 434/292

[56] References Cited

U.S. PATENT DOCUMENTS

| | | | |
|---|---|---|---|
| 320,999 | 6/1885 | Berneike | 434/292 |
| 822,693 | 6/1906 | Seever | 434/693 |
| 1,195,420 | 8/1916 | Tsuru | 434/292 |

Primary Examiner—Gregory E. McNeill
Attorney, Agent, or Firm—Monty Koslover

[57] ABSTRACT

An apparatus for simulating a large scale, rotating representation of the solar system inner planets and the Sun is described, comprising a series of moving and stationary concentric rings arranged about a pedestal, above which is a highly reflective globe representing the Sun supported on a column of high velocity air. Above each of the moving rings, and rotating with the rings, are globes representing the inner planets Mercury, Venus and the Earth, each planet being supported on a column of high velocity air. The Earth representation also has a Moon globe that rotates about it on a column of air. The entire top surface of the rings, moving and stationary, is painted dark blue, with plentiful representations of twinkling 'stars' scattered about the surface. The apparatus is large, and is intended to be used as an educational tool in museums and the like, or be a large public display, or be combined with clocks.

13 Claims, 12 Drawing Figures

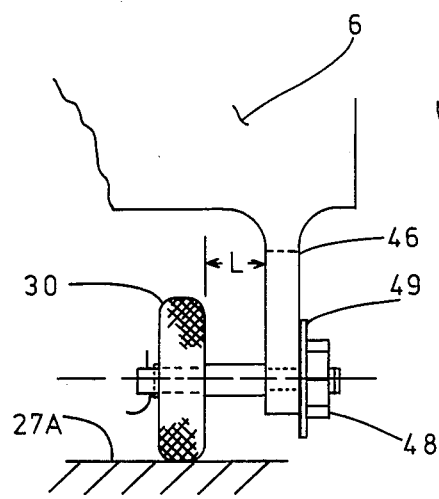
Fig. 8A
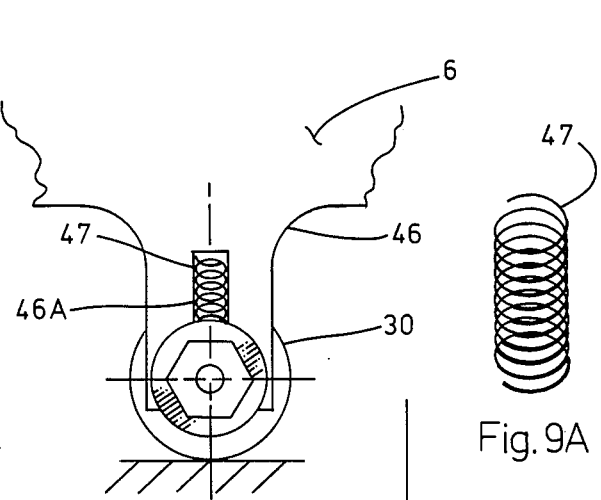
Fig. 8B
Fig. 9A
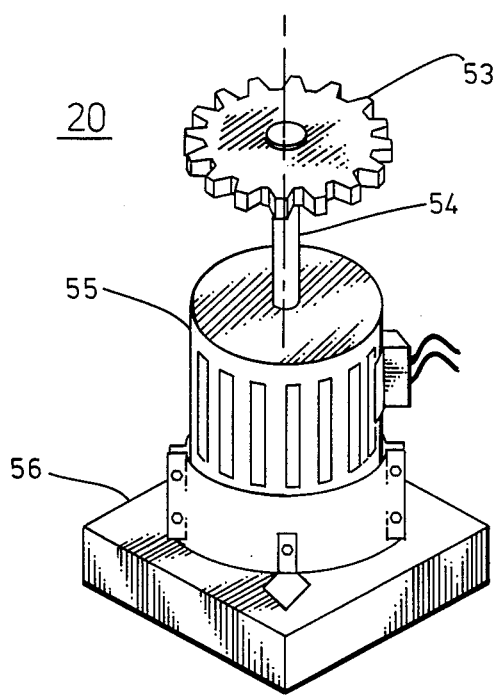
Fig.10
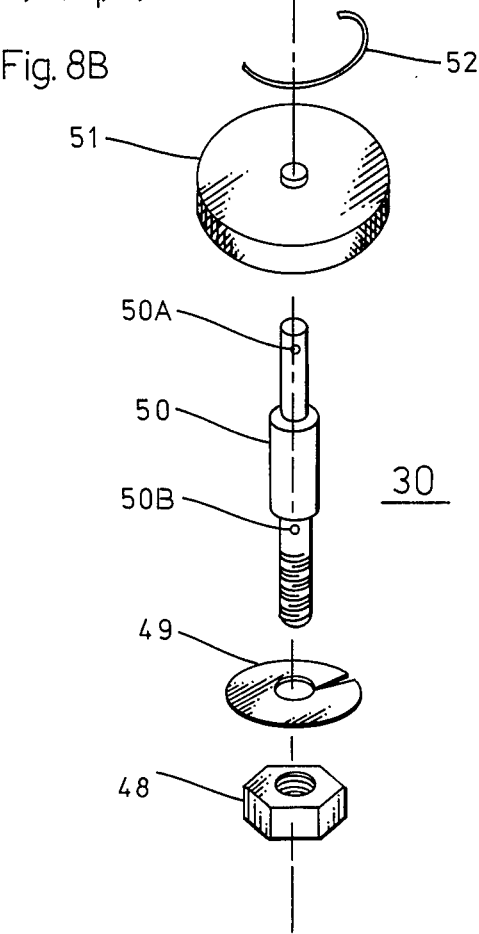
Fig. 9

SOLAR SYSTEM SIMULATOR

BACKGROUND OF THE INVENTION

1. Field of the Invention.

This invention relates to displays and models of the solar system, such as are used in science museums, and more particularly to a large scale rotating model of the solar system and to an assembly and mechanism for supporting and driving such.

2. Description of the Prior Art.

Sir Isaac Newton built a model of the solar system in the seventeenth century. His machine consisted of geared disks on which were attached balls representing the planets. When the disks rotated, the 'planets' appeared to rotate around the Sun. Another model is an astronomical tool used in classrooms, that has the Sun, represented by a globe, mounted on a vertical rod. Attached to the bottom of the vertical rod, and at right angles to it, is a horizontal rod on which is mounted a globe representing the Earth and a further arm holding a 'Moon'. The horizontal rod can be made to rotate around the vertical rod, and the Earth and Moon thus appear to rotate around the Sun.

Similar mechanical models are known to exist in various science museums. In all cases, the globes representing the planets are attached to their motive component by some means. In general, however, none of the foregoing models express the seemingly independent movements of the planets in space around the Sun, and the sheer emptiness and large scale of the solar system. It would be easier to visualize the planets if they were not so obviously tied to their supports. Thus, there exists a need for a device capable of displaying planets orbiting the Sun, where the planets are 'floating' in space. At the same time, the device should be simple in operation and suitable for public educational viewing.

SUMMARY OF THE INVENTION

The invention comprises a series of concentric rings arranged about a pedestal, above which is a globe representing the Sun, supported on a column of moving air. Several of the rings rotate slowly at different speeds around the 'Sun', while other rings are stationary and serve to overlap the moving rings. At various locations above each of the moving rings, are model globes representing the inner solar planets Mercury, Venus and the Earth, each planet being supported on a column of moving air. The Earth representation also has a Moon that rotates about it on a column of air. The entire top surface of the rings is painted dark blue, with plentiful representations of twinkling 'stars' scattered about the surface.

Below the upper surface, and hidden from view by the overlap-rings, the Mercury, Venus and Earth rings are geared, and each driven by an electric motor which has a driving gear attached to it. Forced air is supplied to nozzles underneath each of the planets and the Sun globe, by external blowers that communicate the air through plastic tubing air channels and air plenums under each moving ring, and also to the Sun pedestal. When the blowers are turned off, the Sun globe and the planet globes rest on cups formed by their air support nozzles.

Accordingly, it is a principal object of this invention to provide an apparatus which displays models of the inner planets rotating about a model of the Sun, all appearing to float in space.

Another object is to provide a means of supporting and driving the planet models in an approximately correct speed relationship to each other.

It is another object to provide an apparatus that can be scaled up and down in size, so as to be an educational tool in a classroom area, or be a large public display for amusement and pleasure.

Further objects and advantages of the invention, will become apparent from a study of the following portion of the specification, the claims and the attached drawings.

BRIEF DESCRIPTION OF THE DRAWINGS

FIG. 8A is a side view of a typical support wheel assembly in position, holding up a moving ring; a plurality of support wheel assemblies being used for each ring;

FIG. 8B is an end view of a typical support wheel assembly in position;

FIG. 9 is an exploded view of a support wheel assembly;

FIG. 9A is a compression spring which is applied to the support wheel assembly; and FIG. 10 is a perspective view of a typical drive assembly, there being a drive assembly for each moving ring.

DESCRIPTION OF THE PREFERRED EMBODIMENTS

Figure 1:
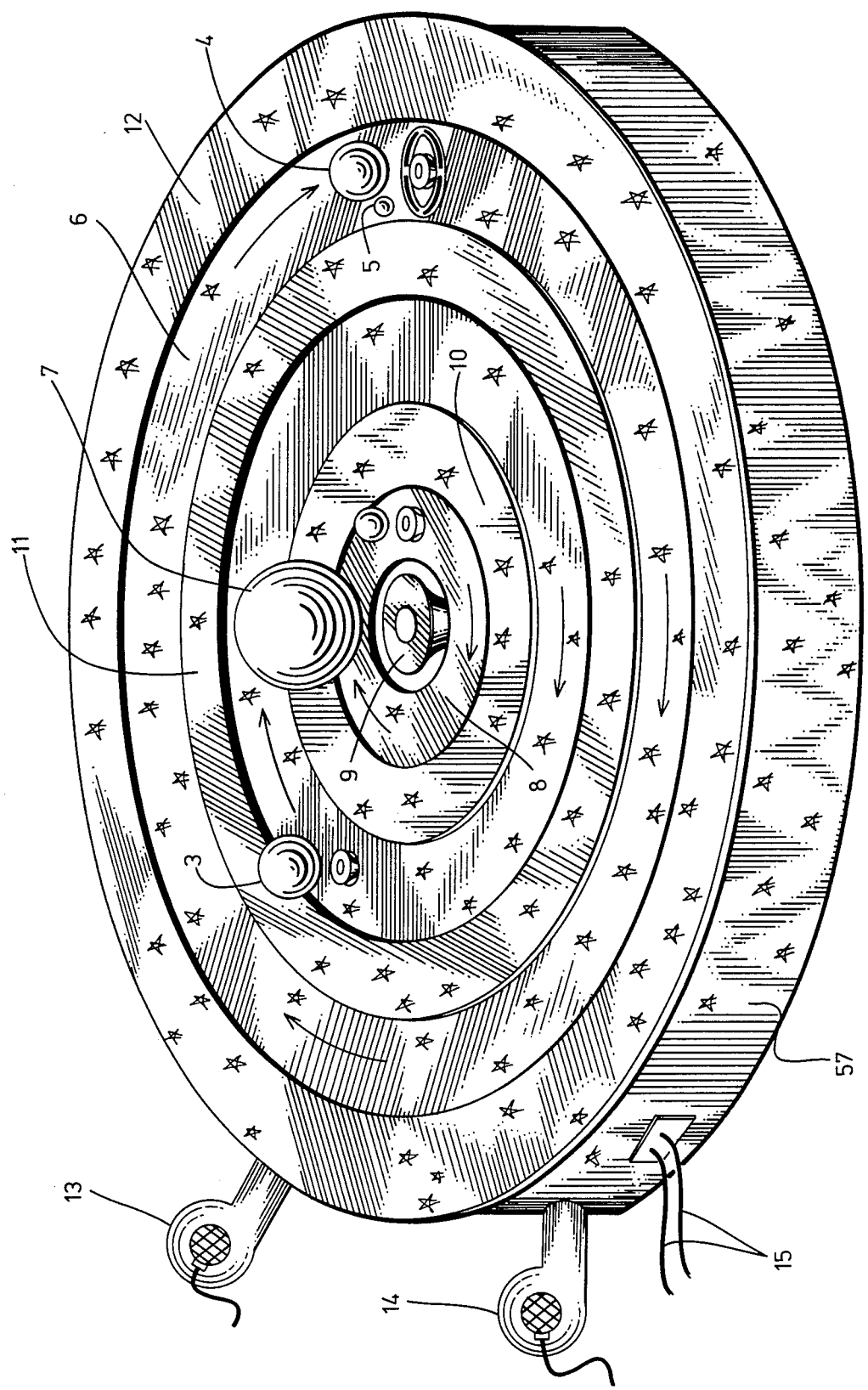
FIG. 1 is a perspective of the device, illustrating the apparatus showing the inner planets orbiting around the Sun.

Referring particularly to the drawings, there is shown in FIG. 1 a preferred embodiment of the solar system simulator, adapted to display the inner planets only and the Sun. The apparatus includes a Sun globe 1, a Mercury globe 2, a Venus globe 3, an Earth globe 4 and a Moon globe 5. The Sun globe 1 and the planet globes are supported and driven by a moving Earth-ring 6, moving Venus-ring 7, moving Mercury-ring 8 and solar pedestal 9. A first overlap-ring 10, second overlap-ring 11 and third overlap-ring 12, are fixed in position and act to shield the operating mechanism from view, presenting an appearance of dark solar space lit by stars. A first blower 13 and second blower 14 are depicted supplying high velocity air to the equipment. A plurality of blowers may be employed, as determined by the size of the solar simulator and the volume of high velocity air required. This high velocity air is required to support the Sun globe 1 and the planet globes, causing them to float in air an appreciable distance above the surface of the solar pedestal 9 and the moving planetary rings. Electric power lines 15 are brought in to supply the equipment drive motors, located under the rings and not shown in this view. Application of electric power to the blowers and drive motors may be controlled by an external switchboard, not shown here. An outside curtain wall 57, which is hung from third overlap-ring 12, serves to finish the outer appearance of the device.

The solar system simulator depicted in FIG. 1 is envisaged as being from 4 feet to 22 feet diameter in size. This would cover the inner planets as shown. Additional moving and stationary rings could be added for each of the remaining six planets (Mars, etc.) as desired.

Figure 2:
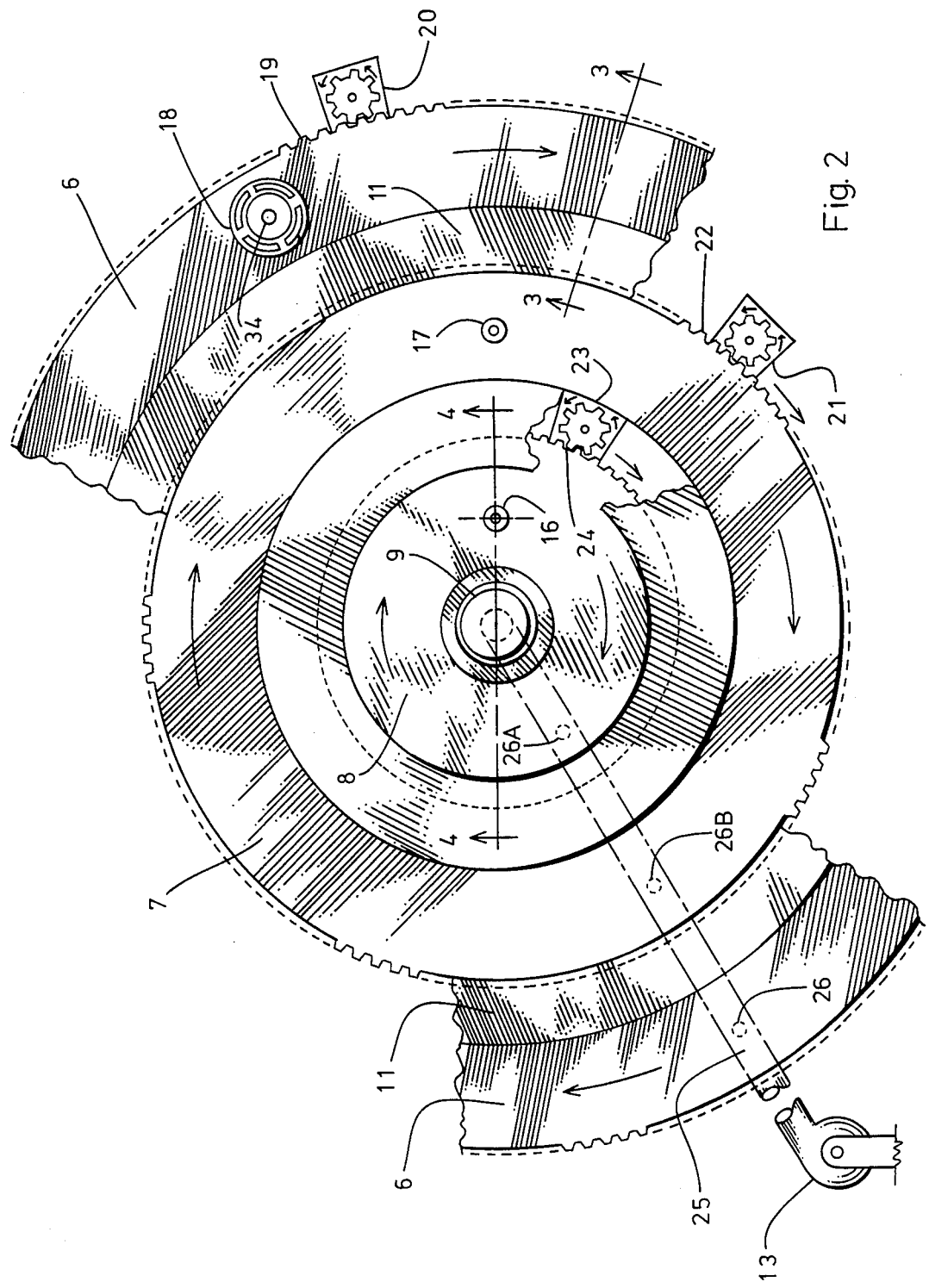
FIG. 2 is a partial plan view of the device; in this drawing, parts of the rings are removed to show detail of the ring gears, driving gears and forced air input.

Referring now to FIG. 2, there is shown a partial plan view of the solar system simulator, particularly showing detail of the moving Earth-ring 6, the moving Venus-ring 7 and the moving Mercury-ring 8. These planetary rings are caused to rotate by the gear action of first drive assembly 20, second drive assembly 21, and third drive assembly 23. The speed of rotation for each of the moving planetary rings, differs by the ratio of the actual speed of revolution about the Sun, of the planets. For example, if the Earth-ring 6 performs one revolution in 5 minutes, corresponding to an actual 365.25 day revolution about the Sun, the Venus-ring 7 would perform one revolution in 3.08 minutes, corresponding to an actual 224.7 day revolution about the Sun. Similarly, the Mercury-ring 8 would perform one revolution every 1.2 minutes, corresponding to an actual 88 day period.

The Earth-ring 6 has spur gear teeth cut in its outer circumference 19 for interaction with a spur gear mounted on first drive assembly 20. Similarly, Venus-ring 7 has spur gear teeth cut in its outer circumference 22, and Mercury-ring 8 has spur gear teeth cut in its outer circumference 24. The size and diameter of each drive assembly spur gear is selected so that combined with its rotational speed, the desired rotation of the Earth-ring 6, Venus-ring 7 or Mercury-ring 8 is produced. Compound spur gears may be used for each drive assembly as needed, to achieve the desired rotational speeds.

Figure 4:
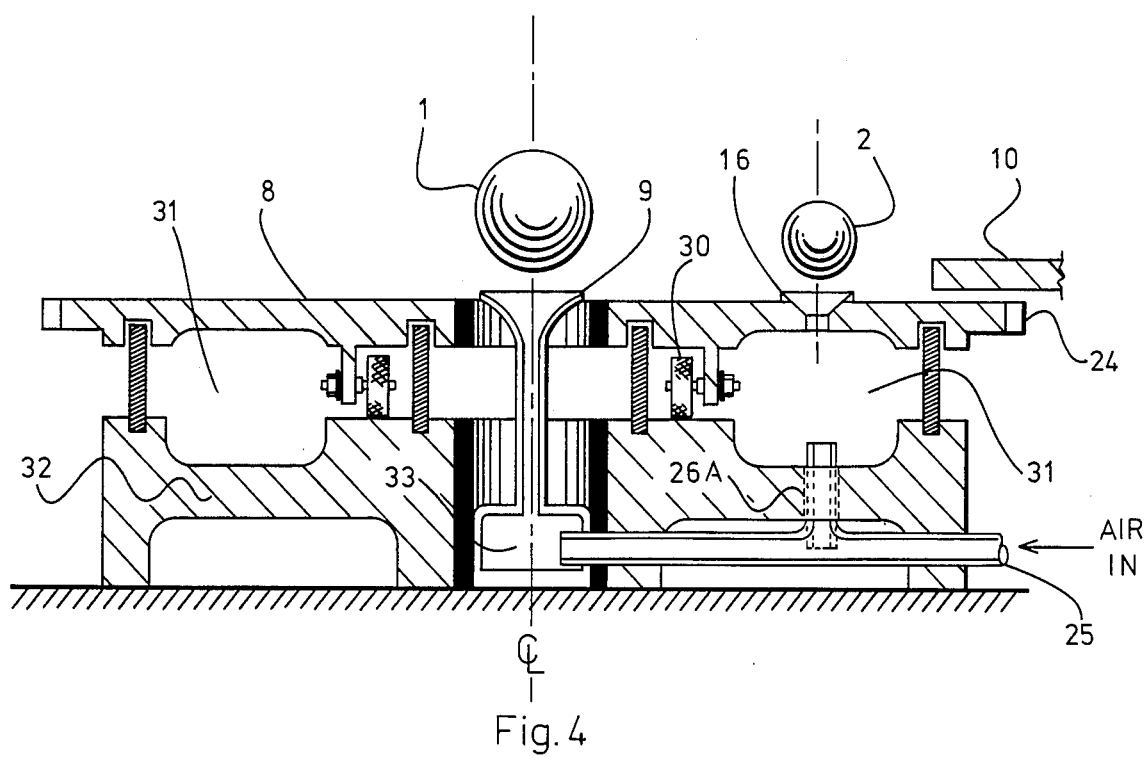
FIG. 4 is a cross-section view of the central portion of the device taken along line 4—4 of FIG. 2, illustrating a cross-section of the Mercury-ring assembly and the Solar pedestal.
Figure 5:
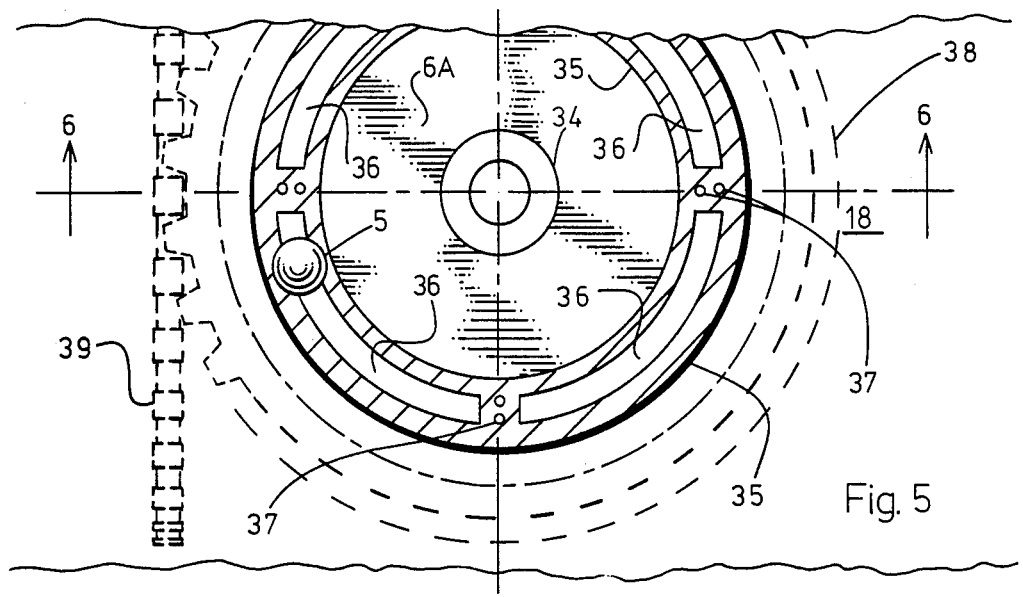
FIG. 5 is a partial top plan view of the Earth-Moon air support system which is located on the rotating Earth ring.
Figure 6:
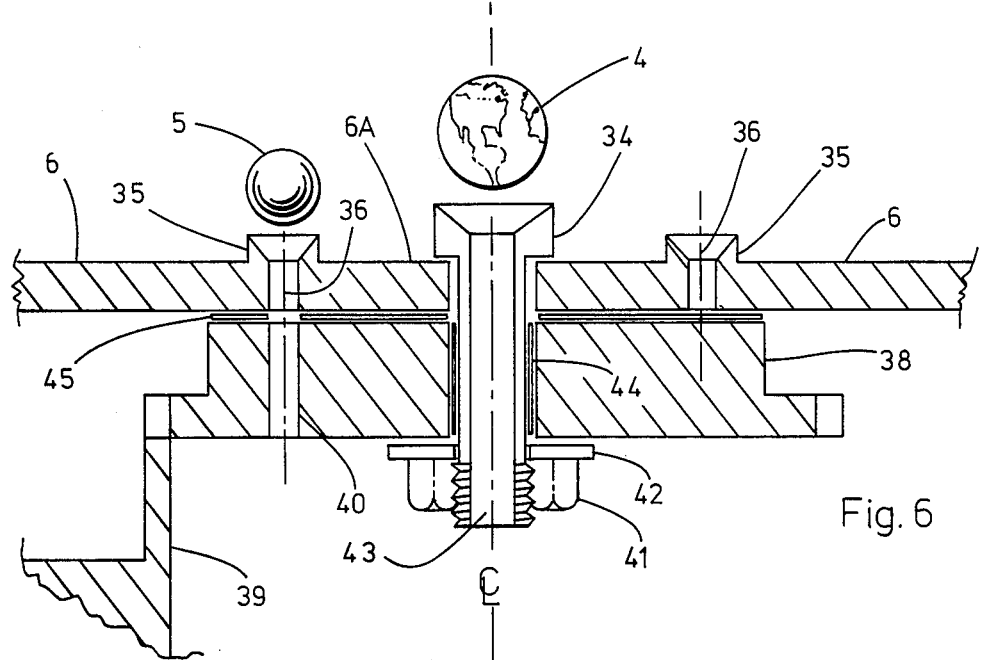
FIG. 6 is a cross-section view of the Earth-Moon air support system taken along line 6—6 of FIG. 5 and FIG. 7.
Figure 7:
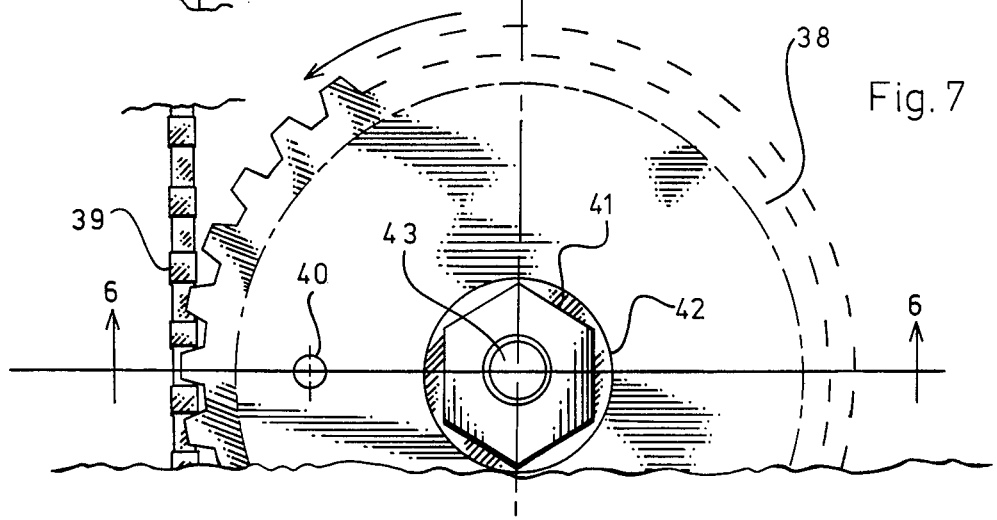
FIG. 7 is a partial plan view looking at the bottom of the Moon gear.

On the Mercury-ring 8 there is located a first air nozzle 16 for supporting the Mercury globe 2. Similarly, on the Venus-ring 7 there is located a second air nozzle 17 for supporting the Venus globe 3. These air nozzle arrangements are relatively simple and static constructions as shown in FIG. 4. However, the Earth-Moon air support requires a more complicated method. This is because the Moon globe 5 is required to revolve around the Earth globe 4. Referring again to FIG. 2, on the Earth-ring 6 there is mounted an Earth-Moon air support system 18. This comprises a central third air nozzle 34 for supporting the Earth globe 4, and a circular track with discontinuous air slits to support the Moon globe 5. The system which is illustrated in FIGS. 5, 6 and 7, and described later, causes a column of air supporting the Moon globe 5, to rotate around the Earth globe 4.

One of a plurality of blowers 13 is illustrated supplying forced air through an air channel 25, and holes 26 in the air channel, to plenums under each planetary moving ring and thence to the air nozzles that support each planet globe. The underneath structure mechanism allowing the moving rings to rotate, is now described.

Figure 3:
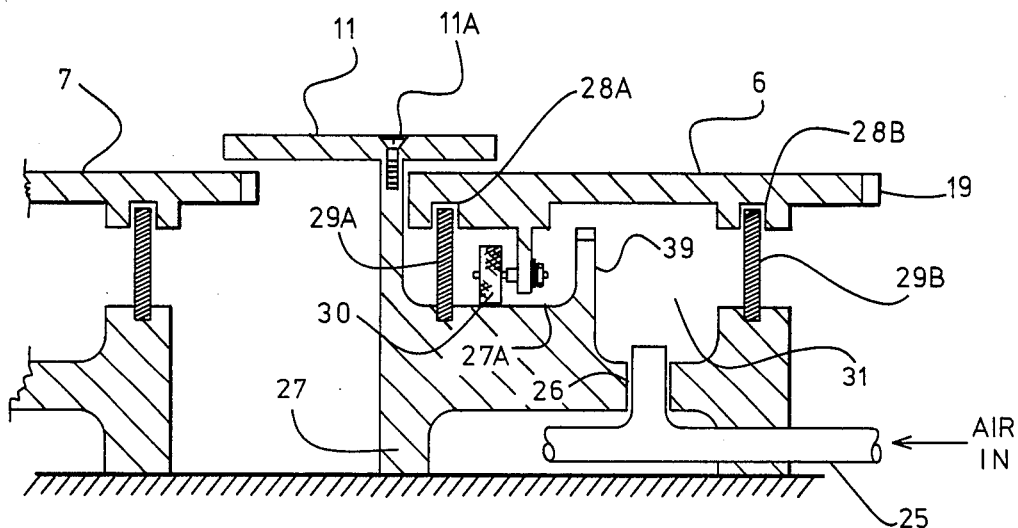
FIG. 3 is a cross-section view of a portion of device taken along line 3—3 of FIG. 2, illustrating a cross-section of the Earth-ring assembly.

Refer to FIGS. 3 and 4 which are cross-section views taken along line 3—3 of FIG. 2 and line 4—4 of FIG. 2 respectively. The cross-section view of FIG. 3 is of the Earth-ring assembly. However, it is typical also for the Venus-ring assembly which is identical in shape and structure, but proportionally smaller in diameter because Venus is closer to the Sun. The Earth-ring assembly is comprised of two structures. These are the Earth-ring 6 which is moving, and the first ring-base assembly 27 which is stationary. Earth-ring 6 has two concentric grooves 28A and 28B formed in its underneath surface, and a plurality of support wheel assemblies 30 attached, so that Earth-ring 6 may ride on the surface 27A provided by first ring-base assembly 27. A circular gear-tooth rack 39 projects above the first ring base assembly 27, for interaction with the Moon gear described later. The first ring-base assembly also includes embedded, a first and second circular wall 29A and 29B providing an edge which fits in grooves 28A and 28B of the Earth-ring 6, and completes the circular air plenum 31. The tops of the circular walls 29A and 29B are covered with 'Teflon', or a similar solid lubricant, to reduce the bearing friction of the Earth-ring 6 on the walls and to provide a barrier to air leakage from the air plenum 31. Forced air is introduced into air plenum 31 through air channel 25 and a first hole 26 in first ring-base assembly 27. To complete the first ring-base assembly 27, a second overlap-ring 11 is fastened to it by screws 11A counter-sunk in the surface of second overlap-ring 11. As depicted in FIG. 3, the second overlap-ring covers both the inner circumference edge of Earth-ring 6 and the outer circumference edge of Venus-ring 7, allowing space between the two ring systems for the drive gears and motors.

Referring particularly to FIG. 4, it is seen that the structure of the Mercury-ring assembly comprising the Mercury-ring 8 and a second ring-base assembly 32, is esssentially the same as that of the Earth-ring 6 and its ring-base assembly 27. The exception being that no central overlap-ring or gear-tooth rack are required. The hollow solar pedestal 9 stands in the center space created by second ring-base assembly 32 and the Mercury-ring 8. Forced air is supplied through an air channel 25 to an air cavity 33 in the base of the solar pedestal 9. The air then travels up a tube in the solar pedestal and exits through a wide cup shaped nozzle at the top, supporting the Sun globe 1. A first air nozzle 16 is formed in the Mercury-ring 8, tnrough which high velocity air passes to support the Mercury globe 2. When the air supply is turned off, the Sun globe 1 and the Mercury globe 2 will rest on the cups formed by their respective nozzles. This is also true for the Venus globe 3 and the Earth globe 4.

Referring now to FIGS. 5, 6 and 7, there is shown a detail of the Earth-Moon air support system 18 referred to earlier. FIG. 6 illustrates the cross-section view taken along line 6—6 of FIGS. 5 and 7. The approach here is to utilize a slowly rotating Moon gear 38, in which a single hole 40 is drilled near its periphery, causing an air column to rotate about the central third air nozzle 34 and supporting the Moon globe 5. The Moon gear 38 engages with the fixed gear tooth rack 39 mounted on first ring-base assembly 27, and is caused to rotate. The Moon gear 38 is held against the lower surface of the Earth-ring 6, by third air nozzle 34 which has a lower threaded section, and utilizes a nut 41 and lockwasher 42 for fastening. A 'Teflon' disk 45 and 'Teflon' sleeve 44 provide air sealing and lubrication for the rotating bearing surfaces of the Moon gear 38.

In operation, as the Moon gear 38 rotates, high velocity air passes through the hole 40 in the Moon gear 38 and up through air slit 36 in the Earth-ring 6. At the same time, high velocity air passes through the tube 43 of the third air nozzle 34, and then exits upward to support the Earth globe 4.

Circular retaining walls 35 are formed in the surface of Earth-ring 6 for the purpose of retaining the Moon globe 5 when the air supply is shut off. The retaining walls 35 form a continuous rim around the inner and outer circumference of the discontinuous air slits 36, acting also to channel the column of air emanating from below. A multiplicity of small air holes 37 are placed at the 'bridges' of material holding the central portion 6A with the third air nozzle 34 to the rest of the Earth-ring 6. These small air holes 37 reduce the interruption in air flow from below to a minimum.

Referring again to FIGS. 5, 6 and 7, it should be noted that the gear tooth rack 39 is fixed and circular. As Earth-ring 6 rotates, Moon gear 38 moves with it, and engaged by the gear tooth rack 39, is caused to slowly rotate. The gearing is selected so that the Moon gear 38, and thus Moon globe 5, will make approximately 13 revolutions around the Earth globe 4 for one complete revolution of Earth-ring 6. Another approach which might be used for the Moon gear drive, is to use an electric motor to which is attached a worm-gear for driving tne Moon gear 38. The electric power for the motor could be brought in through slip-rings or similar devices.

FIGS. 8A and 8B show detail of how the support wheel assemblies 30 are mounted under the planet moving rings. As a reference, part of the Earth-ring 6 is depicted. Part of the Earth-ring 6 projects down below itself to form a wheel mount 46. There are a plurality of wheel mounts 46 for each planet moving ring, their number depending on the diameter of the particular moving ring. Referring to FIGS. 8A and 8B, an aperture 46A is formed in wheel mount 46 for the purpose of mounting the support wheel assembly 30. Each support wheel assembly 30 is fastened to its wheel mount 46 by a locknut 48 and lockwasher 49. A spring 47 in compression, exerts downward pressure against the axle 50 of the support wheel assembly 30, so as to keep all the wheels bearing against the surface 27A of the ring-base assembly. Distance 'L' shown wide in FIG. 8A for clarity, is actually quite small, being typically approximately ⅛th inch. This is necessary to keep the moment-arm of the support wheel assembly 30 to a minimum, reducing stress on the assembly.

FIG. 9 is an exploded view of a support wheel assembly 30. Each support wheel assembly comprises a locknut 48, a lockwasher 49, an axle 50, a wheel 51 and a wheel retainer 52. A compression spring 47 is depicted in FIG. 9A. The wheel 51 contains sealed roller bearings and may be made of aluminum, steel, or a suitable molded plastic. The axle 50, locknut 48, lockwasher 49 and wheel retainer 52 are made of steel. Compression spring 47 is made of spring steel. A first hole 50A is located in the axle 50 for the purpose of inserting the wheel retainer 52. A second hole 50B is located in the axle 50 for the purpose of engaging the end of the compression spring 47 when the support wheel assembly 30 is put in place as shown in FIG. 8B.

Referring lastly to FIG. 10 there is shown a perspective view of a typical drive assembly 20, comprising a drive gear 53, a drive gear axle 54, an electric motor 55 and a motor pillow block 56. Although depicted with a single spur gear as the drive gear 53, compound reducing gears may be mounted on the drive gear axle as required to achieve the desired rotational speed of the drive gear. This familiar method is not illustrated.

The materials used for constructing the planet moving rings and ring-bases are preferably a molded plastic, for the sake of lightness and maintenance. However, any suitable lightweight rigid material may be used. The Sun globe 1, Mercury globe 2, Venus globe 3, Earth globe 4 and the Moon globe 5, may be made of polystyrene foam or a similar lightweight material. The Sun globe 1 has a highly reflective surface, such as would be achieved by coating with aluminum foil. To enhance the effect, a distant light should be focused on the Sun globe 1 so that it may reflect the light toward the planets. Each of the planet globes and the Moon globe are painted to resemble their surfaces as seen from space, showing continents and craters, etc. Finally, the upper surface of the moving rings and the overlapping rings are painted a dark blue, with a plentiful representation of twinkling 'stars' scattered over the surface. Thus, the appearance of the solar system simulator from above, will resemble dark space, with a shining 'sun' at its center and planets orbiting about it.

From the above description, it is apparent that the preferred embodiment achieves the objects of the present invention. Alternative embodiments and various modifications of the embodiments depicted will be apparent from the above description to those skilled in the art. These and other alternatives are considered to be equivalent and within the scope and spirit of the present invention.

Having described the invention, what is claimed is:

1. Apparatus for displaying a representation of the solar system, and particularly the inner planets and the Sun, the apparatus comprising:

(a) a model Earth globe and a model Moon globe;

(b) an Earth-ring assembly having an annular shape, said Earth-ring assembly comprising two structures: a rotating Earth-ring and a first ring-base assembly which is stationary; said rotating Earth-ring providing support for said model Earth and Moon globes, orbiting a model of the Sun; said first ring-base assembly providing support for said Earth-ring, and the structure for delivering forced air through nozzles to said model Earth and Moon globes, supporting them in the air;

(c) a model Venus globe and a model Mercury globe;

(d) a Venus-ring assembly, identical in shape, structure and composition to said Earth-ring assembly, except that said Venus-ring assembly is proportionally smaller in diameter than said Earth-ring assembly, and does not include an Earth-Moon support system; said Venus-ring assembly providing the mechanism for supporting said Venus globe in air, orbiting a model Sun globe;

(e) a Mercury-ring assembly, identical in shape, structure and composition to said Venus-ring assembly, except that said Mercury-ring assembly is proportionally smaller in diameter than said Venus-ring assembly; said Mercury-ring assembly providing the mechanism for supporting a Mercury globe in air, orbiting a model Sun globe;

(f) a model Sun globe;

(g) a solar pedestal for supporting said Sun globe in air;

(h) means for driving said rotating Earth-ring, rotating Venus-ring and rotating Mercury-ring; and (i) means for providing a sufficient volume of high velocity air to each said ring-base assembly and to said solar pedestal, for the purpose of supporting each said model globe.

2. The apparatus as defined in claim 1 wherein:
said Earth-ring assembly may be fabricated of any suitable lightweight rigid material such as molded plastic; said rotating Earth-ring is of annular shape and has spur gear teeth cut in its outer circumference for interaction with a drive, said rotating Earth-ring includes an Earth-Moon air support system mounted on it and a plurality of support wheel assemblies attached below it, providing support to said rotating Earth-ring; said rotating Earth-ring further includes cut in its underneath surface, two concentric grooves for the purpose of fitting to said first ring-base assembly; said first ring-base assembly comprising a first ring base, a second overlap-ring and a first and second circular wall, said first ring-base providing a surface on which said support wheel assemblies ride, said second overlap-ring acting to shield the underneath mechanism from view, said first and second circular walls providing an edge which fits in the two concentric grooves of said rotating Earth-ring, forming a circular air plenum for forced air to be transported to said nozzles.

3. The apparatus as defined in claim 2 wherein:
said Earth-Moon air support system comprises a Moon gear, a third air nozzle, a lockwasher and locknut, a circular gear tooth rack, circular discontinuous air slits and circular retaining walls; said discontinuous air slits being cut through the thickness of said Earth-ring in the shape and size of the model Moon orbit around the Earth-globe, and said circular retaining walls being formed around said air slits for the purpose of retaining the Moon globe when the air supply is shut off; said third air nozzle having a lower threaded section and utilizing said lockwasher and locknut for fastening said Moon gear beneath said Earth-ring; said third air nozzle providing a path for air from said air plenum to exit upwards, holding up said Earth globe; said Moon gear having a single hole cut in it near its periphery, allowing high velocity air to pass through said hole and thence through said discontinuous air slit, causing as said Moon gear rotates, an air column to rotate about said third air nozzle and supporting said Moon globe; said Moon gear including a 'Teflon' disk between its upper surface and the lower surface of said Earth-ring, and a 'Teflon' sleeve between said third air nozzle body and said Moon gear, for the purpose of lubrication of rotating bearing surfaces, and for air sealing.

4. The apparatus as defined in claim 2 wherein:
said rotating Earth-ring further includes a plurality of wheel mounts formed in its lower surface, for the purpose of mounting said plurality of support wheel assemblies; each said wheel mount having an aperture formed in it, for inserting and adjusting said support wheel assembly.

5. The apparatus as defined in claim 2 wherein:
said plurality of support wheel assemblies in each assembly comprise a locknut, a lockwasher, an axle, a wheel and a wheel retainer; said wheel contains sealed roller bearings for smooth operation, said axle incorporates a first hole for the purpose of inserting said wheel retainer, and a second hole for the purpose of engaging the end of a compression spring; said compression spring being fitted in the aperture of said wheel mount and bearing against said axle of said support wheel assembly, exerting downward pressure against said axle so as to keep said wheel bearing against the surface of said first ring base.

6. The apparatus as defined in claim 2 wherein:
the tops of said first and second circular walls are coated with 'Teflon', or a similar solid lubricant, to reduce the bearing friction of said Earth-ring on said circular walls, as said Earth-ring rotates, and also to provide a barrier to air leakage from said air plenum.

7. The first ring-base assembly of claim 2 which further includes:
a first air hole, through which high velocity air enters from an air channel and into said air plenum; and a circular gear tooth rack fixed in said first ring-base for the purpose of engaging with said Moon gear, causing said Moon gear to rotate when said Earth-ring is moving.

8. The apparatus as defined in claim 1 wherein:
said model Sun globe, Mercury globe, Venus globe, Earth globe and Moon globe may be made of polystyrene foam or a similar lightweight material; said Sun globe having a highly reflective surface such as would be achieved by coating with aluminum foil; said planet and Moon globes are painted to resemble their surfaces as seen from space; said Earth-ring assembly, Venus-ring assembly and Mercury-ring assembly being painted a dark blue, with a representation of 'stars' painted on the surface, so as to resemble dark space.

9. The apparatus as defined in claim 1 wherein:
said Mercury-ring assembly includes a first air nozzle in the Mercury-ring surface, for the purpose of supporting said Mercury globe by a column of high velocity air.

10. The apparatus as defined in claim 1 wherein:
said Venus-ring assembly includes a second air nozzle in the Venus-ring surface, for the purpose of supporting said Venus globe by a column of high velocity air.

11. The apparatus as defined in claim 1 wherein:
said solar pedestal is hollow, being formed to have a wide nozzle at its top, a hollow tube from top to bottom and an air cavity in its base, receiving high velocity air; said solar pedestal being made of molded plastic or a similar rigid material.

12. The apparatus as defined in claim 1 wherein:
said means for driving said rotating Earth-ring, rotating Venus-ring and rotating Mercury-ring, includes a drive assembly comprising an electric motor, a drive gear axle which is connected to the axis of said electric motor, a motor pillow block for supporting and fastening said electric motor and a single spur gear or compound reducing gears mounted on said drive gear axle, the electric motor providing the electromotive force for said means; said spur gear or compound reducing gears being sized and selected so as to achieve the desired rotational speed.

13. The apparatus as defined in claim 1 wherein:
said means for providing a sufficient volume of high velocity air includes a plurality of electric-powered blowers and air channels;
said air channels being fabricated from plastic tubing, and being used to transport the high velocity air from said blowers which are located on the outer periphery of the apparatus, to said solar pedestal base and to said circular air plenums underneath each moving ring.

* * * * *